US012700599B2

(12) United States Patent
Hoyt et al.

(10) Patent No.:    US 12,700,599 B2
(45) Date of Patent:        Aug. 4, 2026

(54) SYSTEM FOR SUPPORTING A FUEL CELL STACK

(71) Applicant: PLUG POWER INC., Latham, NY (US)

(72) Inventors: Robert Hoyt, Latham, NY (US); Max Marciniak, Latham, NY (US); David Martinchek, Latham, NY (US); Dylan Share, Latham, NY (US); Steven Spencer, Latham, NY (US); Michael Zanoni, Slingerlands, NY (US)

(73) Assignee: Plug Power Inc., Slingerlands, NY (US)

( * ) Notice: Subject to any disclaimer, the term of this patent is extended or adjusted under 35 U.S.C. 154(b) by 842 days.

(21) Appl. No.: 17/822,556

(22) Filed: Aug. 26, 2022

(65) Prior Publication Data

US 2024/0072270 A1      Feb. 29, 2024

(51) Int. Cl.
H01M 8/0271        (2016.01)
H01M 8/0247        (2016.01)
(52) U.S. Cl.
CPC ....... H01M 8/0271 (2013.01); H01M 8/0247 (2013.01)
(58) Field of Classification Search
CPC ............. H01M 8/0271; H01M 8/0247; H01M 8/2404; Y02E 60/50
See application file for complete search history.

(56) References Cited

U.S. PATENT DOCUMENTS

| | | | |
|---|---|---|---|
| 9,590,263 | B2 | 3/2017 | Martinchek et al. |
| 2015/0111125 | A1* | 4/2015 | Farrington ........... H01M 8/241 |
| | | | 429/479 |
| 2020/0052320 | A1* | 2/2020 | Rock ................... H01M 8/2475 |
| 2020/0203742 | A1 | 6/2020 | Buvat et al. |
| 2021/0202963 | A1 | 7/2021 | Wenzel et al. |

FOREIGN PATENT DOCUMENTS

| | | |
|---|---|---|
| CN | 111052473 A | 4/2020 |
| JP | 2008103348 A | 5/2008 |
| KR | 20160044418 A | 4/2016 |
| KR | 20220033785 A | 3/2022 |

OTHER PUBLICATIONS

Korean Intellectual Property Office, International Search Report and Written Opinion, dated Dec. 18, 2023, 10 pp.

* cited by examiner

*Primary Examiner* — Ula C Ruddock
*Assistant Examiner* — Sarika Gupta
(74) *Attorney, Agent, or Firm* — Victor Cardona, Esq; Heslin Rothenberg Farley & Mesiti P.C.

(57)            ABSTRACT

A fuel cell system includes a plurality of fuel cell plates. A first plate of the fuel cell plates is connected to a plurality of plate supports located on a periphery of the first plate. Each support of the plurality of plate supports is electrically insulating and bounds an opening for receiving an aligning member therein.

20 Claims, 17 Drawing Sheets

207

215

300

209

300

215

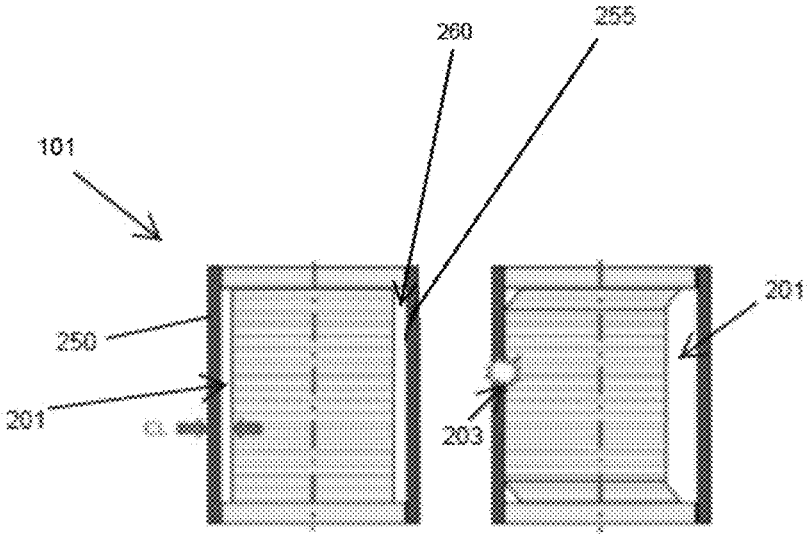
FIG. 7  FIG. 8

350

350

370

200

SYSTEM FOR SUPPORTING A FUEL CELL STACK

TECHNICAL FIELD

The present invention relates, generally, to methods and systems for supporting a fuel cell stack, and more particularly, to systems and methods for supporting a fuel cell stack to minimize damage due to shock and vibration of a fuel cell stack system.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The Membrane Electrode Assembly (hereinafter "MEA") is placed between two electrically conductive plates, each of which has a flow passage to direct the fuel to the anode side and oxidant to the cathode side of the PEM.

Two or more fuel cells can be connected together to increase the overall power output of the assembly. Generally, the cells are connected in series, wherein one side of a plate serves as an anode plate for one cell and the other side of the plate is the cathode plate for the adjacent cell. These are commonly referred to as bipolar plates (hereinafter "BPP"). Alternately, the anode plate of one cell is electrically connected to the separate cathode plate of an adjacent cell. Commonly these two plates are connected back to back and are often bonded together (e.g., bonded by adhesive, weld, or polymer). This bonded pair becomes as one, also commonly called a bipolar plate, since anode and cathode plates represent the positive and negative poles, electrically. Such a series of connected multiple fuel cells is referred to as a fuel cell stack. The stack typically includes means for directing the fuel and the oxidant to the anode and cathode flow field channels, respectively. The stack usually includes a means for directing a coolant fluid to interior channels within the stack to absorb heat generated by the exothermic reaction of hydrogen and oxygen within the fuel cells. The stack generally includes means for exhausting the excess fuel and oxidant gases, as well as product water.

The stack also includes an endplate, insulators, membrane electrode assemblies, gaskets, separator plates, electrical connectors and collector plates, among other components, that are integrated together to form the working stack designed to produce electricity. The different plates may be abutted against each other and connected to each other to facilitate the performance of particular functions.

A fuel cell stack may be utilized in vehicle applications such as industrial vehicles (e.g., forklift trucks) or passenger vehicles (e.g., automobiles). In such a situation, a vehicle and thus a fuel cell stack therein may be subject to a force or collision, or other shock or vibration, which may apply a force to the fuel cell stack in a manner that could damage the stack. Seismic activity could further cause such shocks and vibrations.

The stack may be received in a metal casing such that the stack is spaced from inner surfaces of such a casing. A shock or vibration could cause a deformation of the fuel cell stack such that one or more plates thereof could contact the inner surfaces of the casing which could cause a short circuit, deformation of such plate(s), or other problem with a functioning of the fuel cell stack.

Thus, there is a need for improved fuel cell systems and improved methods of manufacturing fuel cells that to minimize damage to fuel cell components and minimize disruptions to operation of a fuel cell due to shocks and vibrations.

SUMMARY OF THE INVENTION

The present invention provides, in a first aspect, a fuel cell system which includes a plurality of fuel cell plates. A first plate of the plurality of fuel cell plates is connected to a plurality of plate supports located on a periphery of the first plate. Each support of the plurality of plate supports is electrically insulating and bounds an opening for receiving an aligning member therein.

The present invention provides, in a second aspect, a method for use in assembling a fuel cell stack which includes connecting a plurality of plate supports to a periphery of a first fuel cell plate. Each support of the plurality of plate supports is electrically insulating and bounds an opening for receiving an alignment member therein.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

FIG. 7 is a side cross-sectional schematic view of the fuel cell system of FIG. 1;

FIG. 8 is a side cross-sectional schematic view of the system of FIG. 7 after a shock or vibration is applied thereto;

DETAILED DESCRIPTION OF THE INVENTION

Figure 1:
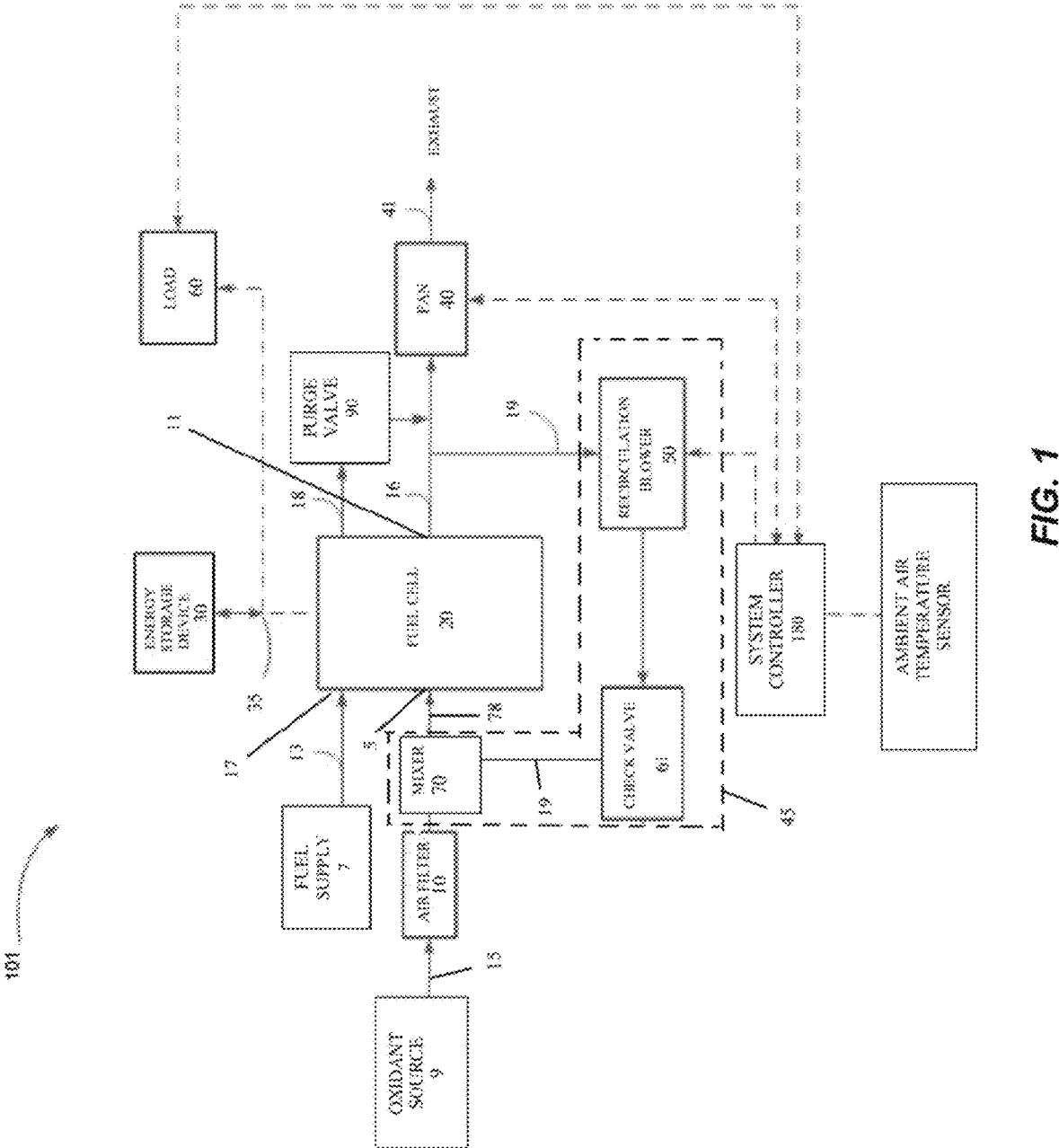
FIG. 1 is a block diagram of a fuel cell system in accordance with the invention.

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In accordance with the principals of the present invention, systems and methods for supporting a fuel cell stack are provided. In an example depicted in FIG. 1, a fuel cell system 101 is referred to as the assembled, or complete, system which functionally together with all parts thereof produces electricity and typically includes a fuel cell stack 20 and an energy storage device 30. The fuel cell is supplied with a fuel 13, for example, hydrogen, through a fuel inlet 17. Excess fuel 18 may be exhausted from the fuel cell through a purge valve 90 and may be diluted by a fan 40. In one example, fuel cell stack 20 may have an open cathode architecture of a PEM fuel cell, and combined oxidant and coolant, for example, air, may enter through an inlet air filter 10 coupled to an inlet 5 of fuel cell 20. Excess coolant/oxidant and heat may be exhausted from a fuel cell cathode of fuel cell stack 20 through an outlet 11 to fan 40 which may exhaust the coolant/oxidant and/or excess fuel to a waste exhaust 41, such as the ambient atmosphere. The fuel and coolant/oxidant may be supplied by a fuel supply 7 and an oxidant source 9 (e.g., air), respectively, and other components of a balance of plant, which may include compressors, pumps, valves, fans, electrical connections and sensors.

Figure 2:
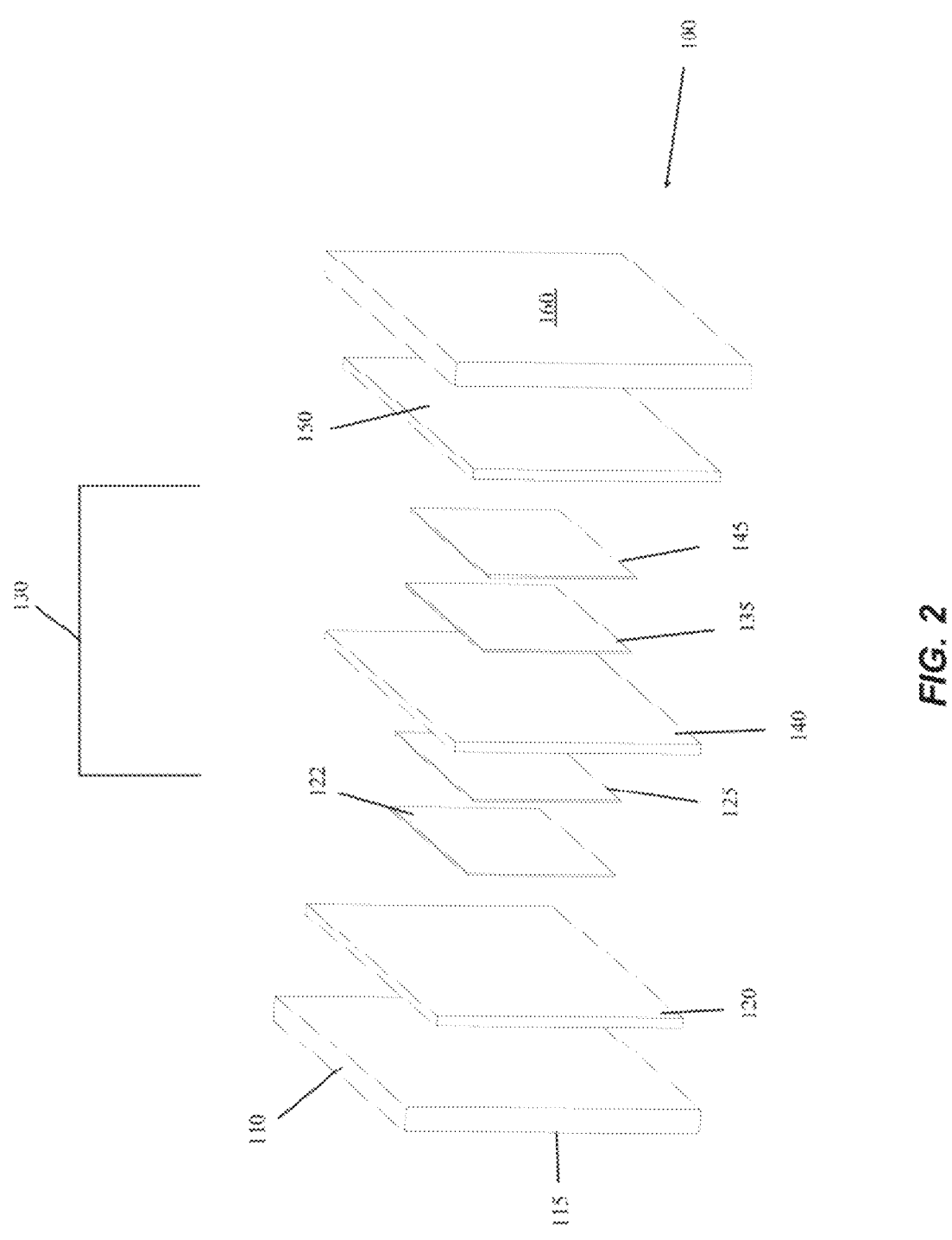
FIG. 2 is a perspective view of a portion of a fuel cell of the fuel cell system of FIG. 1.

FIG. 2 depicts an internal subassembly 100 of fuel cell stack 20 of FIG. 1 including a cathodic end fluid flow plate 110 at an outer end 115 and a flow plate seal 120 on an inner side thereof. A membrane electrode assembly (MEA) 130 is located between seal 120 and a second flow plate seal 150. An anode flow plate 160 is on a second end 165 of subassembly 100.

MEA 130 includes a membrane 140 between a cathode side catalyst layer 125 and an anode side catalyst layer 135. A cathode side gas diffusion layer (GDL) 122 is located between cathode side catalyst layer 125 and flow plate 110. An anode side gas diffusion layer 145 is located between anode side catalyst layer 135 and flow plate 160. Seal 120 and seal 150 may be received in a channel of on an inner side of flow plate 110 and flow plate 160, respectively.

Figure 3:
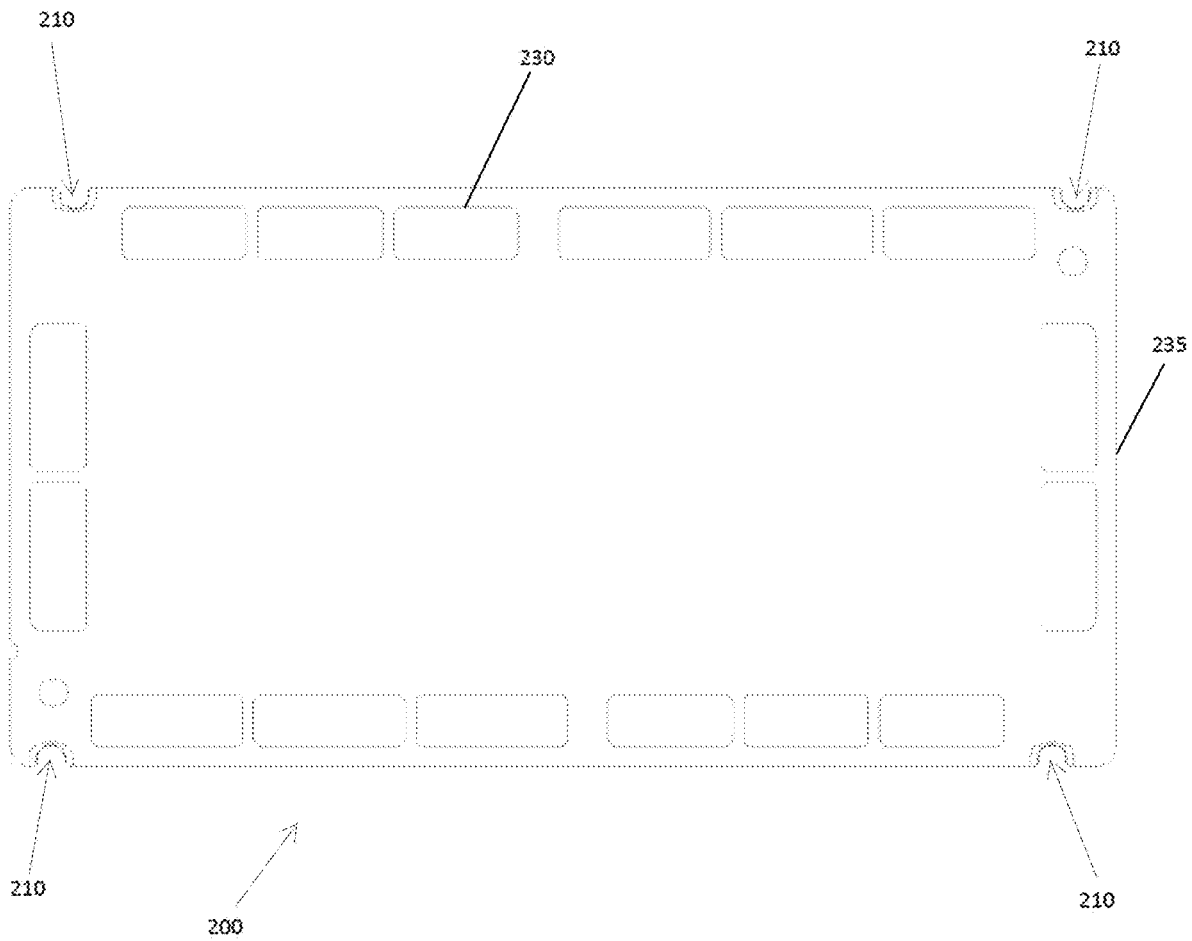
FIG. 3 is a top plan view of a fuel cell end plate of the fuel cell system of FIG. 1.

In an example, FIG. 3 depicts a bipolar plate fuel cell plate 200, which could be a cathode plate (e.g., cathodic end fluid flow plate 110) or an anode fluid flow plate (e.g., anode flow plate 160). Fuel cell plate 200 may have a plurality of supports 210 for inhibiting damage to fuel cell plate 200. Supports 210 may be formed of an electrically non-conductive material (e.g., a plastic such as Celanese Vectra LCP) and may be located at various locations (e.g., at four corners) around a periphery of plate 200, for example.

As depicted in FIGS. 3-6, plate 200 may include a longitudinal side 230 and a lateral side 235. Support 210 may extend away from lateral side 235 in a direction perpendicular to a longitudinal dimension of plate 200 such that support 210 extends further than lateral side 235.

In a simplified example depicted in FIG. 7, fuel-cell system 101 may include a chassis or casing 250 holding a plurality of fuel cell plates 201 (e.g., a plurality of instances of plate 200) separated from an inner surface 255 of casing 250 by a space 260. Plates 201 may be aligned such that lateral sides 235 are located adjacent space 260 as depicted. FIG. 8 depicts an instant after an impact or collision of casing 250 such that a subset 203 of plates 201 held in casing 250 contact inner surface 255. As indicated above, supports 210 may be formed of an electrically non-conductive material (e.g., a plastic) such that a contact of supports 210 of the plates with inner surface 255 of casing 250 would not result in any electrical connection between the plates of the fuel cell stack. More specifically, as indicated above, supports 210 may extend further laterally than lateral side 235 and thus may contact inner surface 255 in a collision, vibration and/or displacement of fuel cell plate 200 of fuel cell plates 201 as described such that supports 210 would contact inner surface 255 prior to lateral side 235 thereby inhibiting or preventing any contact of a remainder of any of fuel cell plates 201 (e.g., plate 200) with inner surface 255. The non-conductive nature of supports 210 coupled with the extension thereof beyond a lateral side (e.g., side 235) of one of plates 201 thus may inhibit or prevent any short circuiting which may result from a contact of the fuel cell plates (e.g., plates 201) with inner surface 255 of fuel cell system 10. In contrast, in the prior art, the lack of such a non-conductive contacting surface extending beyond a remainder of a fuel cell plate may allow a contact of such fuel cell plates formed of metal with such inner surfaces during a shock or collision which could cause an electrical short circuit between such plates via an inner surface (e.g., one of inner surfaces 255). Further, movement of such prior art plates during a collision may cause a misalignment of seals between such plates which may cause a leakage of fuel or oxidant, for example.

Figure 4:
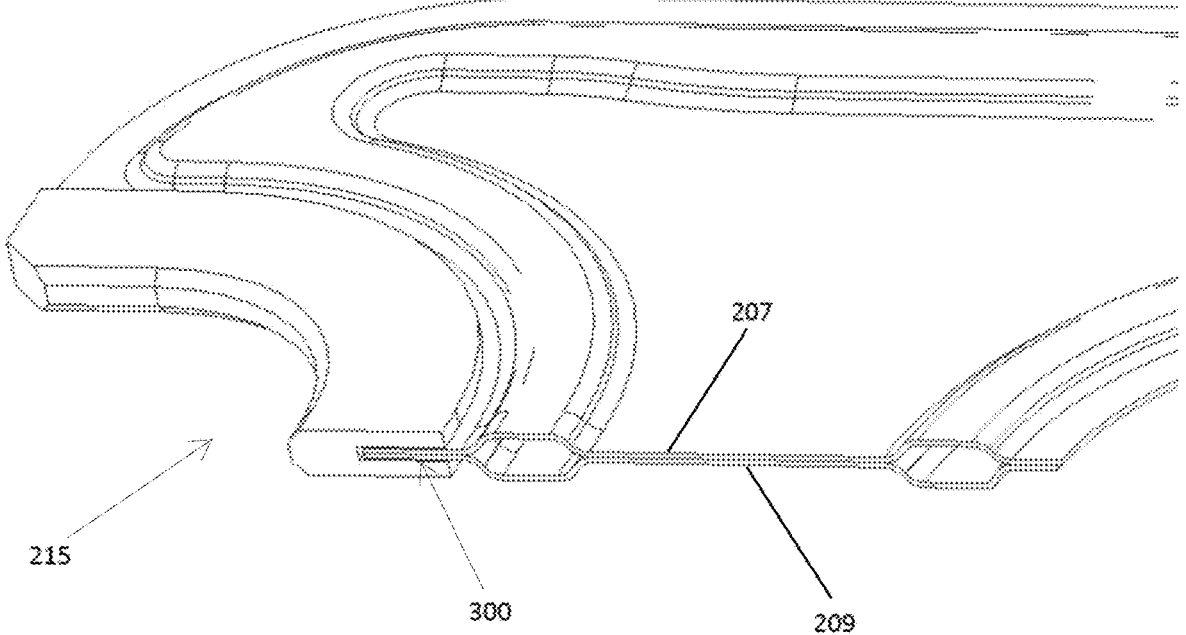
FIG. 4 is a perspective view of a portion of the end plate of FIG. 3 showing a support.
Figure 5:
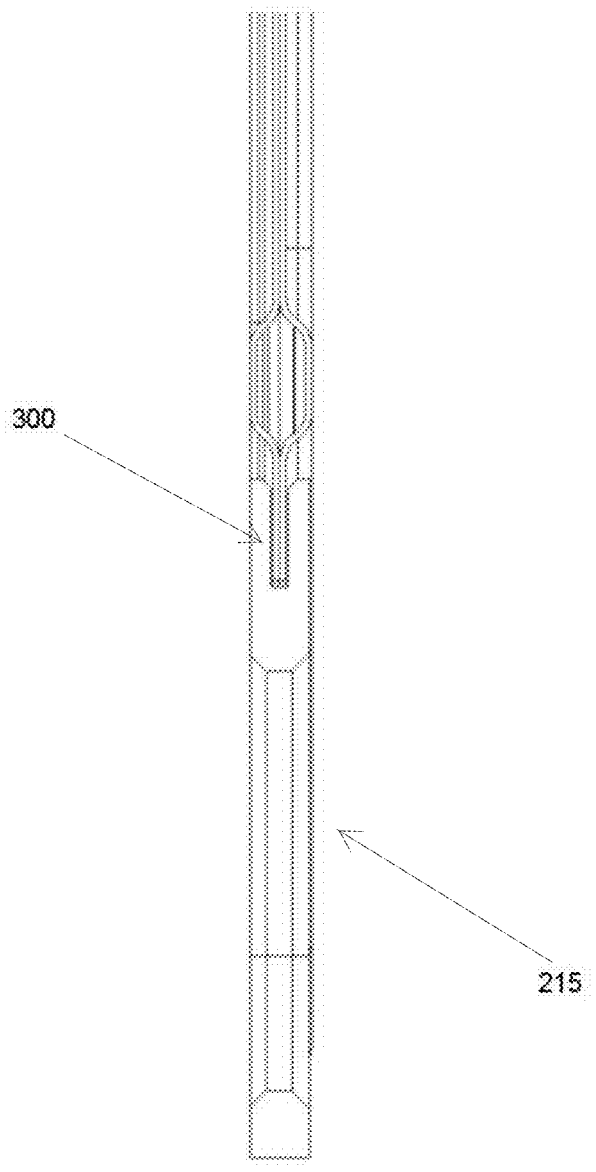
FIG. 5 is an end view of the support of FIG. 4.
Figure 6:
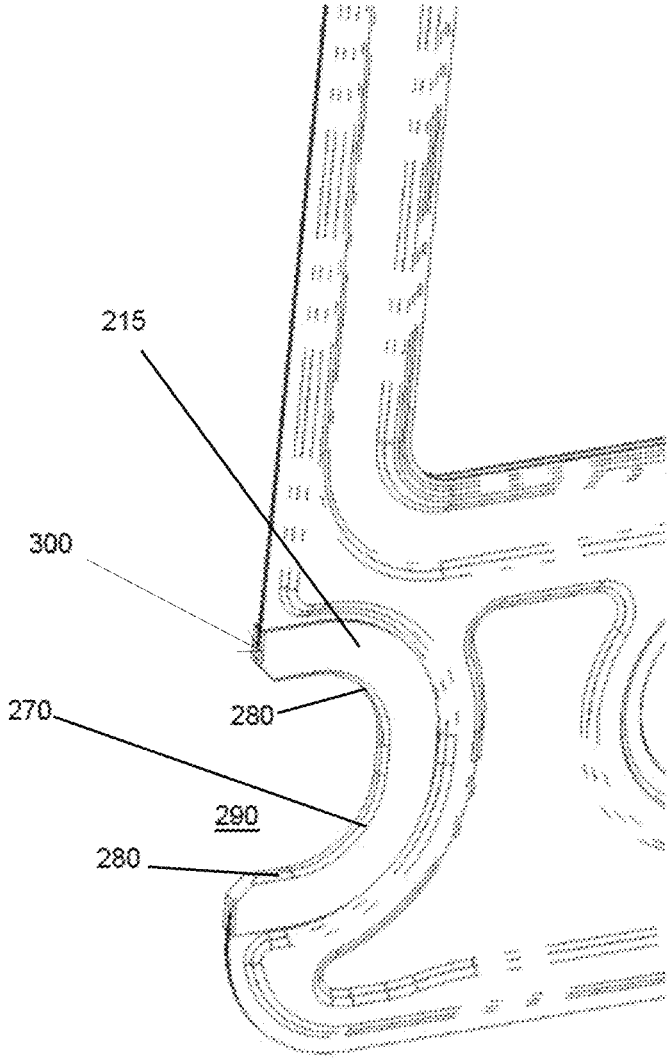
FIG. 6 is a perspective view of the support of FIG. 4 on the end plate.

In an example, a support 215 of supports 210 may include an arched portion 270 and opposite laterally extending portions 280 bounding an opening 290 forming a slot which opens to an exterior of plate 200 as depicted in FIG. 6, for example. Support 215 may include an inner cavity 300 for receiving an outer edge 237 of plate 200 therein, as depicted in FIGS. 4-6 for example. Plate 200 may include a first plate portion 207 and a second plate portion 209 which may be received in cavity 300 as depicted in FIG. 4 for example. Cavity 300 may be configured (e.g., shaped and dimensioned) such that a "snap fit" connection may exist which may inhibit a disconnection between a support (e.g., support 215) and plate 200 when plate is received in cavity 300.

Figure 9:
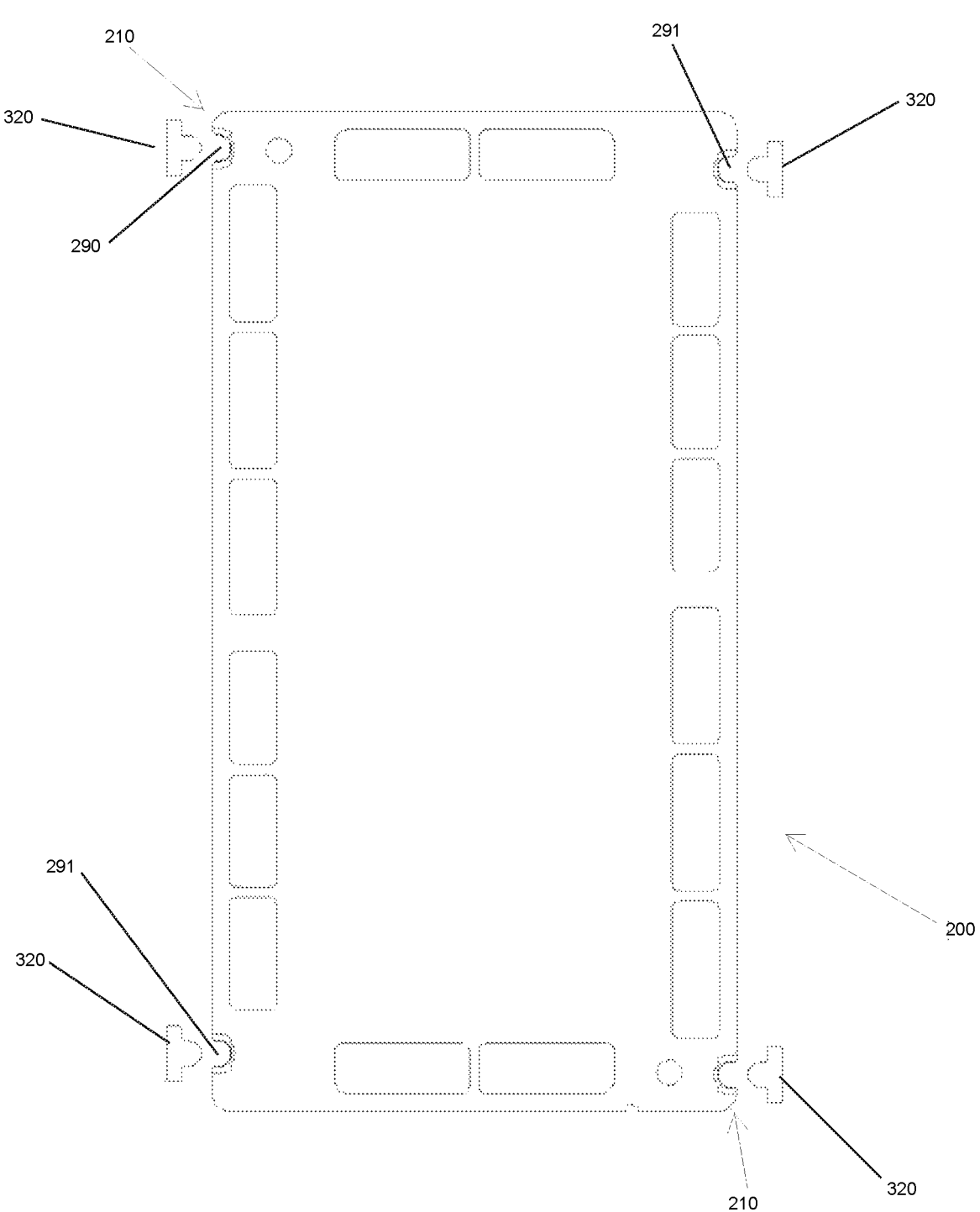
FIG. 9 is a top plan view of the end plate of FIG. 3 with aligning members being inserted in openings of the supports thereof.
Figure 10:
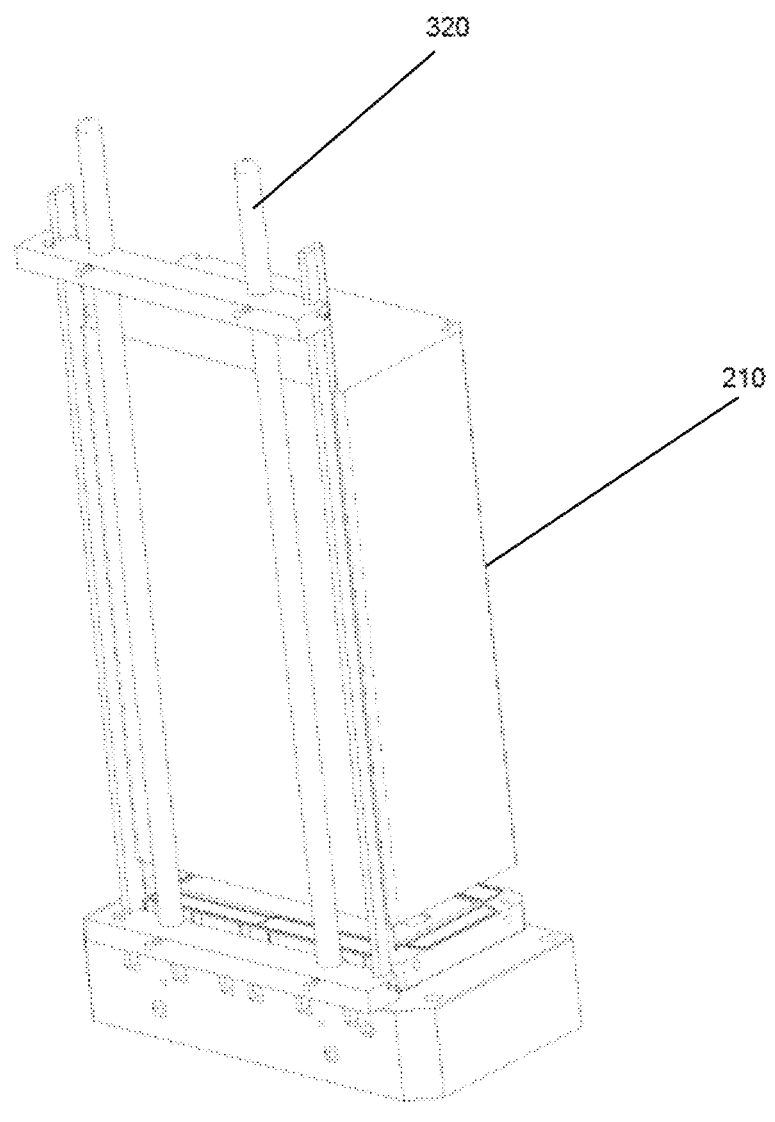
FIG. 10 is a perspective view of a plurality of end plates of the system of FIG. 3 being stacked on a plurality of aligning members.

An aligning member, such as a bar or rod 320 may be received in an opening (e.g., opening 290) of openings 291 of supports 210 as depicted for example in FIGS. 9-10. Rod 320 may be configured (e.g., shaped and dimensioned) to be received in such openings and may be formed of a material (e.g., steel) strong and rigid enough to hold fuel cell plates 201 via supports 210 in a desired position relative to each other during and after assembly of such fuel cell plates with each other into a fuel cell stack (e.g., fuel cell system 20). As described above, rod 320 may be inserted into opening 290 from an exterior of plate 200 and may be movable within opening 290 in a lateral direction (i.e., toward and away from an open exterior thereof) between lateral sides 280 thereof. Multiple instances of support 215 as supports 210 may allow multiple instances of rod 320 to move laterally within such openings. In contrast to closed alignment passages, the use of supports 210 with openings in communication with an exterior of plates 210 may allow movement of such plates in a direction of passage of such openings to the exterior which may inhibit warping of plates and binding of plates which may otherwise occur in prior art closed alignment passages through fuel cell plates.

As depicted in FIG. 10, two instances of rod 320 may be used to stack fuel cell plates 210 thereon during assembly of a fuel cell stack (e.g., fuel cell system 20) via the rods being received in openings (e.g., instances of opening 290) of supports 210.

Figure 15:
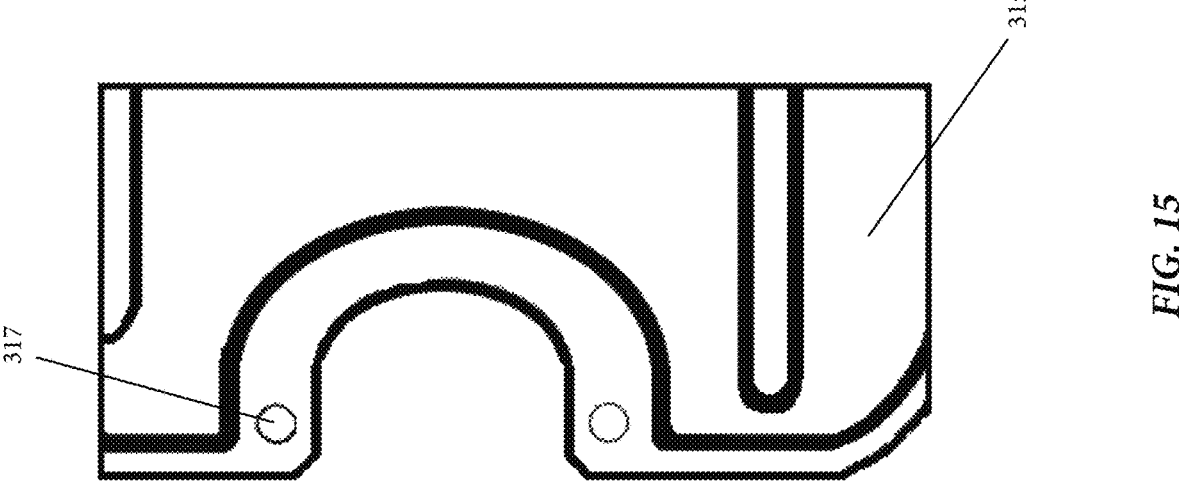
FIG. 15 is a top plan view of a support having upwardly extending aligning projections.
Figure 16:
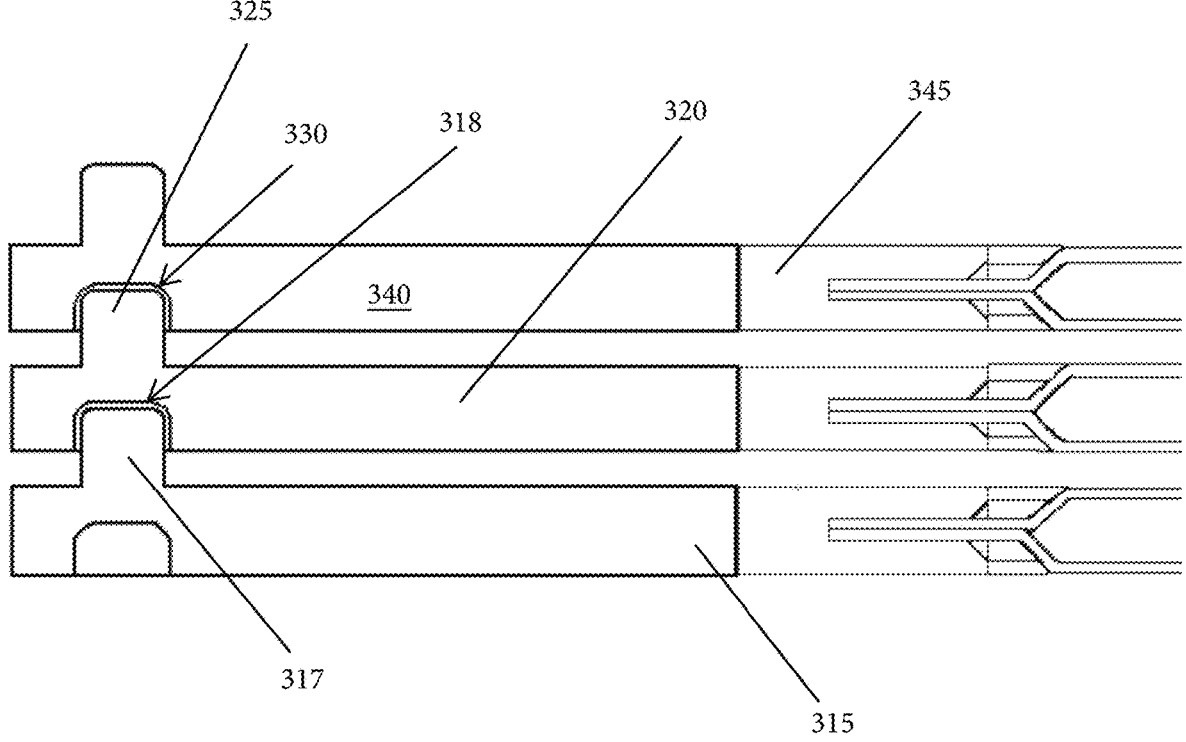
FIG. 16 is a side view of a portion of a plurality of the supports of FIG. 15 connected to a plurality of end plates.

As indicated above, multiple plates 201 may be stacked to form a fuel cell stack (e.g., fuel cell 20) using multiple aligning members, such as instances of rod 320. After such assembly of the plates 201 into a stack such aligning members may be left in place to hold such plates in position relative to each other. In another example such aligning members may be replaced with fiberglass aligning members. In a further example, the aligning members may be removed without any other rods being substituted. In an example, such plates may be held in alignment by an engagement of supports with contacting adjacent supports. For example, supports may include complementary shaped projections and recesses engageable with each other on such supports in contact with each other to inhibit movement of the plates out of an alignment with each other. For example, as depicted in FIGS. 15-16, a support 315, similar to support 215 described above, may include projections 317 configured (e.g., shaped and dimensioned) to be be received in a cavity 318 of a support 320 above such that fuel cell plates connected to such supports may be held in alignment with each other. Support 320 may similarly have one or more projections 325 extending upwardly to be received in a cavity 330 of a support 340 connected to a plate 345.

Figure 11:
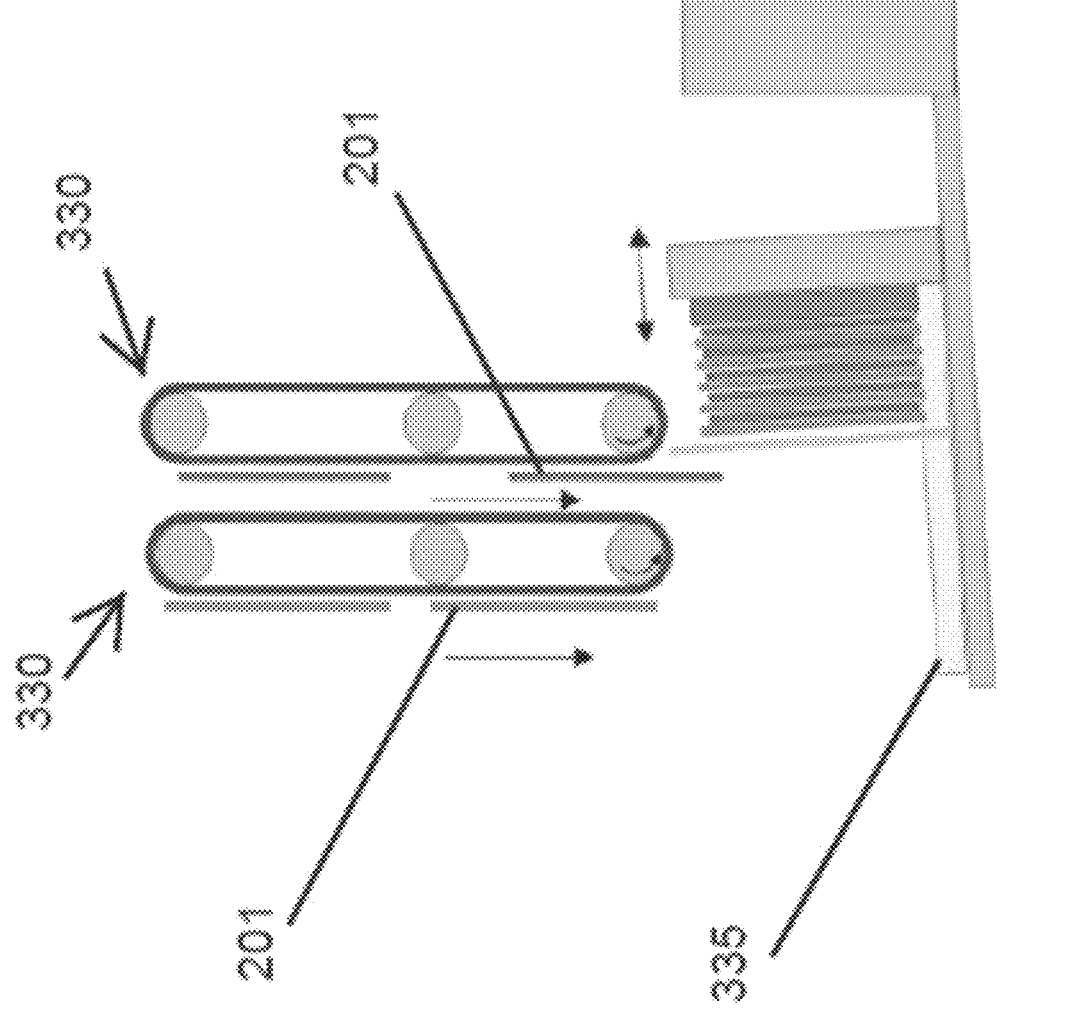
FIG. 11 is a schematic view of a plurality of components of the system of FIG. 1 being assembled.

In an example fuel cell plates (e.g., plates 201) may be stacked such that two supports (e.g., two instances of support 215) on a same lateral side (e.g., lateral side 235) may receive two aligning members or rods to align the plates via such supports similar to FIGS. 9-11. In such an example, a plate of plates 201 may be removed from a remainder of the plates and replaced with a substitute plate. More specifically, in a situation where a fuel cell stack is arranged such that each cell is located on a side horizontally relative to each other plate and lateral sides (e.g., instances of lateral side 235) are arranged as a bottom of each plate, a plate may be vertically raised and removed since each plate is aligned via supports 210 located on the lateral sides (e.g., instances of lateral side 235) at a vertical bottommost location which include openings opening downwardly and thus would not inhibit movement upwardly to allow such substitution. Such upward movement would be in contrast to prior art designs having closed alignment passages which would not offer a degree of freedom to allow such removal and substitution, such as in the case of a replacing a damaged fuel cell plate.

Further, a location of supports on a periphery of plates (e.g., plates 201) with openings (e.g., openings 291) in bounded by the plates such that each opening is in communication directly with an exterior of the plate offers a degree of freedom to reduce a possibility of plates binding during assembly in contrast to prior art closed passages for receiving alignment rods or members. More specifically, plates (e.g., plate 200) received on instances of rod 320 may move on such rods between sides (e.g., sides 280) bounding an opening (e.g., opening 215) such that the plates are not deformed due to movement being constrained by passages receiving such rods.

In a further example depicted in FIG. 11, fuel cell plates 201 may be deposited by a conveyor belt system 330 schematically illustrated such that one or more of rod 335 may be received in supports 210 to align fuel cell plates 201 as described above relative to rod 320.

Figure 12:
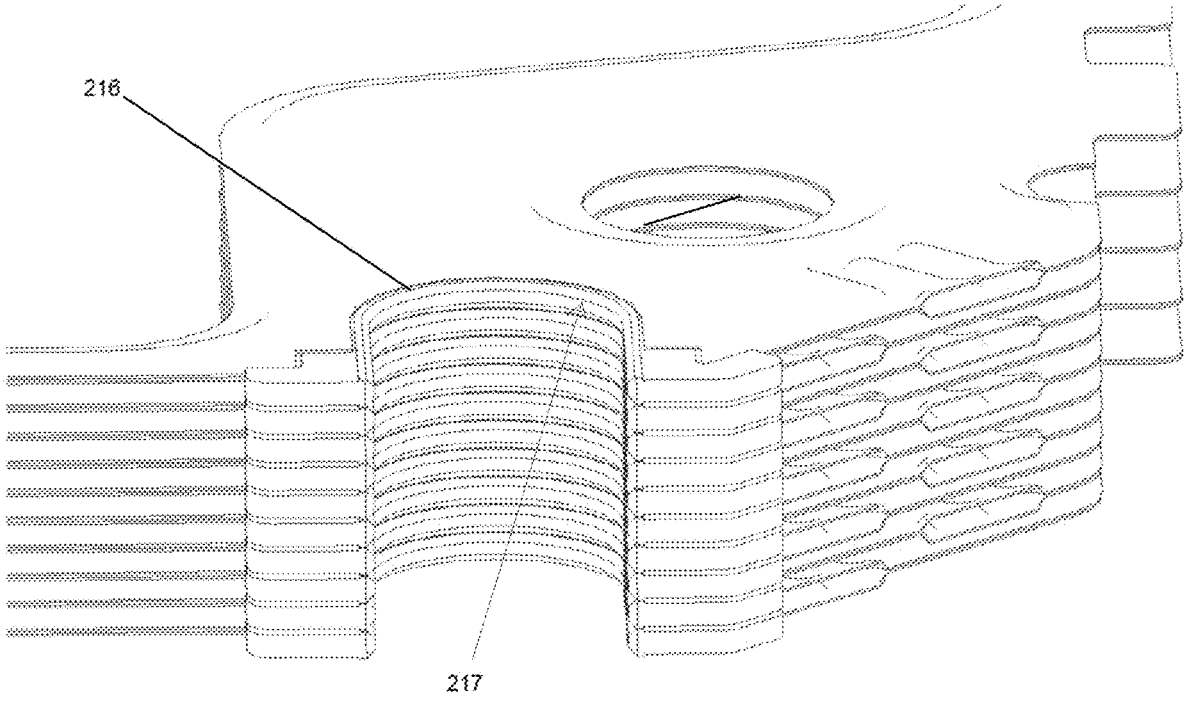
FIG. 12 is a perspective view of another embodiment of a plurality of fuel cell end plates being connected to a plurality of supports.
Figure 17:
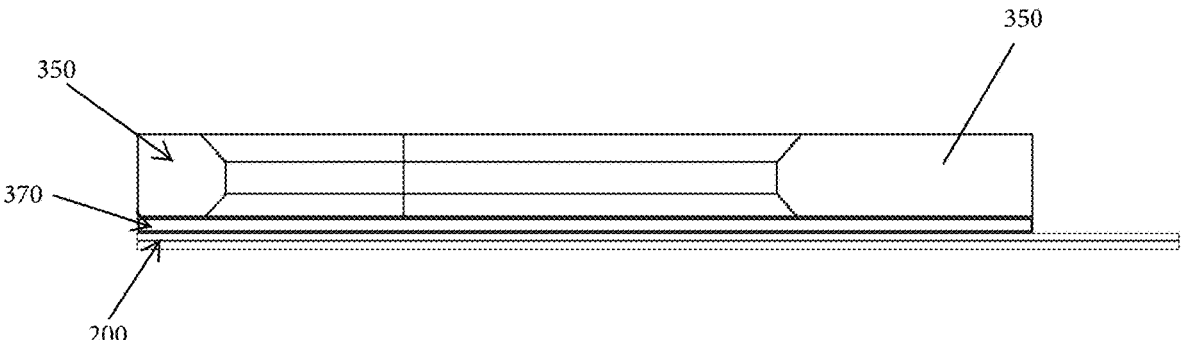
FIG. 17 is a side view of a support connected to an endplate via an adhesive.

In another example depicted in FIG. 12, a support 216 similar to support 215 described above may be received in a cavity 217 of a fuel cell plate 202 similar to plate 200 to connect the support to the fuel cell plate instead of the plate (e.g. plate 200) being received in a cavity of the support (e.g., support 215) In a further example depicted in FIG. 17 [see page 4 of revised disclosure], a support 350, similar to support 215 described above, may be may be connected to a fuel cell plate (e.g., plate 200) via a pressure sensitive adhesive 370 on a peripheral edge or a cutout on a peripheral edge of a fuel cell plate.

As described above, supports 210 may be formed of a plastic or other non-metallic and non-conductive material. A connection of supports 210 to a plate 201 such that the plates are received in inner cavities (e.g., instances of cavity 300) of the plates may allow contact of a rod (e.g., rod 320) or rods with the plastic material of supports 210 during assembly of a fuel cell stack formed of plates 201. A contact of such a plastic material with such a rod may have less of a frictional resistance therebetween than in a prior art situation where the plates (e.g., plates 201) and rods are both formed of metal and in direct contact with each other. Moreover, in some prior art situations, the plates may be thin metal plates subject to being deformed by contact with metal rods. In contrast, a sliding of a support (e.g., support 215) formed of plastic or having a contacting portion formed of plastic relative to a rod (e.g., rod 320) may have less of a frictional resistance, and thus may be less likely to be damaged due to a catching or binding of the rod relative to the support, than in the case of a metal plate contacting such a metal rod.

7

Figure 13:
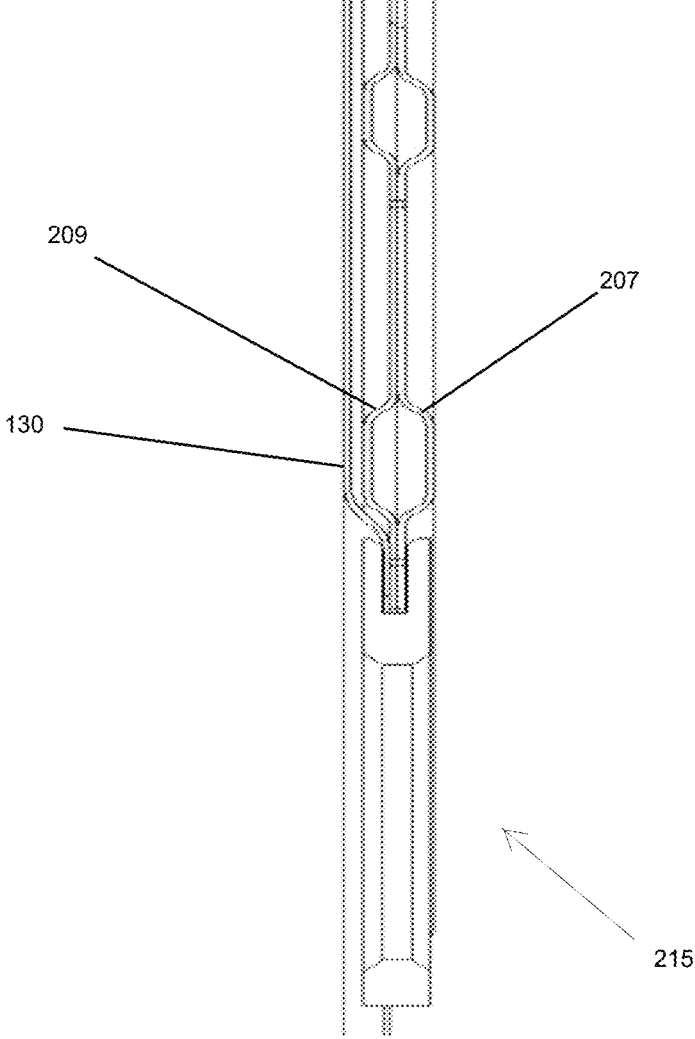
FIG. 13 is an end view of a support connected to a fuel cell end plate and membrane electrode assembly.
Figure 14:
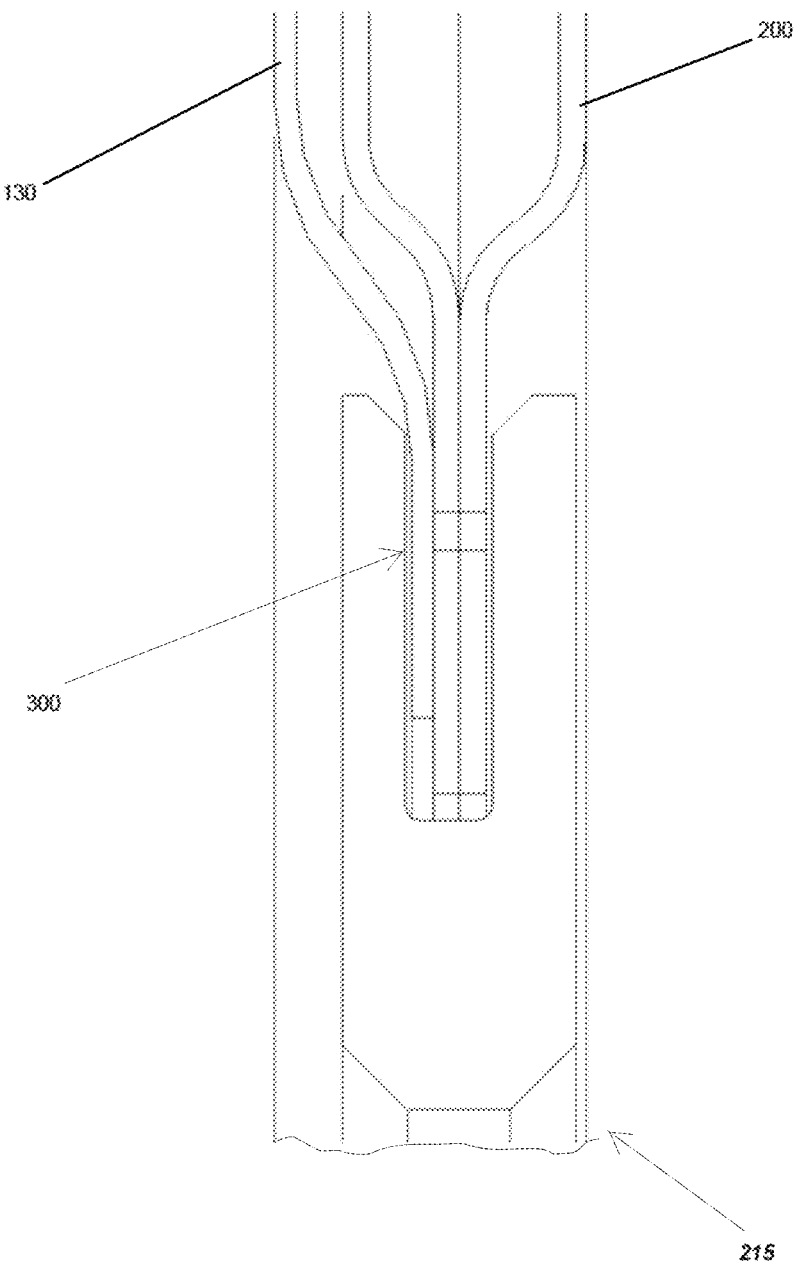
FIG. 14 is a close up view of a portion of the system of FIG. 13.
Figure 18:
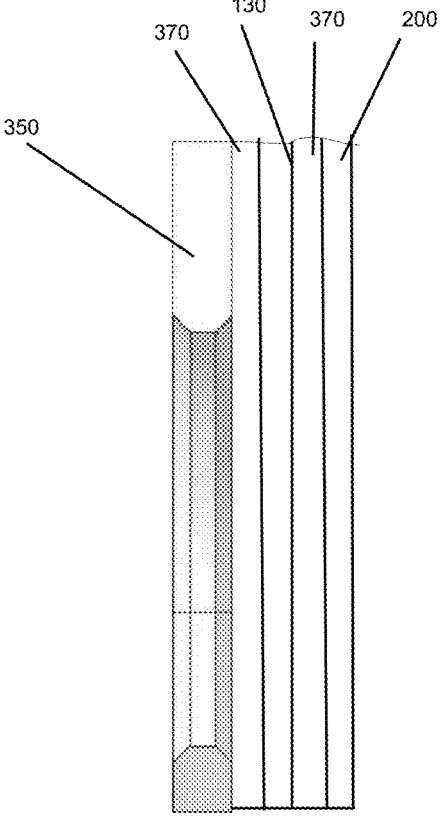
FIG. 18 is a side view of a support connected to an endplate and a membrane electrode assembly via an adhesive.

In an example partially depicted in FIGS. 13-14, supports 201 (e.g., support 215 of supports 201 shown) may connect a membrane electrode assembly (e.g., MEA 130) to a plate, such as plate 200, to allow a manipulation of a subassembly 310 formed of a plate and membrane electrode assembly during an assembly of a fuel cell stack formed of multiple such subassemblies. Such a connection could be performed via a mechanical connection such as MEA 130 being received in cavity 300 of support 215 with plate 100 and connected via a snap fit connection as described above, for example. A plate (e.g., plate 215) and MEA (e.g., MEA 130) may be connected to each other via multiple connections of such supports (e.g., supports 201) via all or some of the supports connected to a plate (e.g., plate 215). Further, a membrane electrode assembly may be connected to a fuel cell plate via a connection to such supports (e.g., supports 201) in any other way that allows a plate and membrane electrode assembly to be unitized as a subassembly to facilitate as assembly of a fuel cell stack (e.g., fuel cell 20). For example, such a membrane electrode assembly (e.g., MEA 130) may be connected to such supports (e.g., support 350) via a pressure sensitive adhesive (e.g., pressure sensitive adhesive 370) and a bipolar plate (e.g., plate 200) may be connected to the MEA via the pressure sensitive adhesive (e.g., pressure sensitive adhesive 370), as depicted in FIG. 18. In another example, a membrane electrode assembly may be connected by a hot melt to a support (e.g., support 215) and then a hot melt may connect the assembly of the membrane electrode assembly and support to a bipolar plate (e.g., plate 200).

In an example, a support (e.g., support 215) connectable to a fuel cell plate (e.g., plate 200) may include one or more Integrated cell voltage monitors. The integration of such monitors in such supports may allow more and better data to be collected relative to an operation of a fuel cell stack (e.g., fuel cell 20) due to the multiple placements of such supports on each plate.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A fuel cell system comprising:
a plurality of metallic fuel cell plates;
a first plate of the fuel cell plates connected to a plurality of plate supports located on a periphery of said first plate, each support of said plurality of plate supports being electrically insulating and bounding a peripheral opening for receiving an aligning member therein, said opening bounding an exterior of said first plate;
each support of said plurality of plate supports extending inwardly from the periphery to connect to the first plate and peripherally past the periphery of the first plate such that each support contacts an external object to inhibit the periphery contacting the external object in response to a movement of the first plate toward the object.

2. The system of claim 1 wherein said plurality of fuel cell plates comprises a second plate having a plurality of second plate supports, and wherein the aligning member is separate from and received in a top opening bounded by a top support of the plurality of plate supports and a bottom opening bounded by a bottom support of the plurality of second plate supports.

3. The system of claim 1 wherein-said plurality of fuel cell plates comprises a second plate having a plurality of second plate supports, said plurality of plate supports and said plurality of second plate supports located between said first plate and said second plate.

4. The system of claim 1 said plurality of fuel cell plates comprises a second plate having a plurality of second plate supports, and each second plate support of said plurality of second plate supports being electrically insulating and bounding a second plate opening for receiving the aligning member therein, wherein said second plate is assembled with said first plate such that said plurality of plate supports is aligned with said plurality of second plate supports.

5. The system of claim 4 wherein the aligning member is a first aligning member of a plurality of aligning members received in the opening of each support and the second plate opening of each second plate support to align said first plate relative to said second plate.

6. The system of claim 1 wherein each support of said plurality of plate supports comprises an inner peripheral cavity receiving an outer peripheral edge of said first plate to connect each support to said first plate.

7. The system of claim 1 wherein each support of said plurality of plate supports is received in an outer peripheral cavity of said first plate to connect each support to said first plate.

8. The system of claim 7 wherein said outer peripheral cavity of said first plate is bounded by a first plate portion and a second plate portion of said first plate.

9. The system of claim 1 wherein said opening is unbounded on a lateral side of said first plate relative to a longitudinal dimension of said first plate, such that said opening is in communication with an exterior of said first plate and is configured to allow an aligning member to pass into said opening from the exterior.

10. The system of claim 1 wherein each support comprises an inner surface bounding said opening, said inner surface comprising an arched surface and opposite lateral surfaces aligned about normal to a longitudinal dimension of said first plate.

11. The system of claim 1 wherein each said support extends outwardly away from said first plate further than said first plate in a direction normal to a longitudinal dimension of said first plate such that said support contacts a casing of a fuel cell stack prior to said first plate.

12. The system of claim 1 wherein each support of said plurality of plate supports extends inwardly past the periphery along a top surface or a bottom surface of said first plate.

13. A method for use in assembling a fuel cell stack comprising:
connecting a plurality of plate supports to a periphery of a first metallic fuel cell plate;
wherein each support of the plurality of plate supports is electrically insulating and bounds a peripheral opening for receiving an aligning member therein, the opening bounding an exterior of said first plate;
each support of said plurality of plate supports extending inwardly from the periphery to connect to the first plate and peripherally past the periphery of the first plate; and
a first support of the plurality of supports contacting an external object to inhibit the periphery contacting the external object in response to a movement of the first plate toward the object.

14. The method of claim 13 further comprising aligning the first plate with a second fuel cell plate by aligning a plate support of the plurality of plate supports with a second plate support of the second fuel cell plate.

15. The method of claim 14 wherein the aligning the first plate with a second fuel cell plate comprises locating an aligning member in the opening of the plate support and in a second opening of the second plate support.

16. The method of claim 13 wherein the connecting the plurality of plate supports to the periphery of the first fuel cell plate comprises receiving a plurality of locations of a peripheral edge of the first fuel cell plate in a plurality of inner peripheral cavities of the plurality of plate supports.

17. The method of claim 13 wherein the connecting the plurality of plate supports to the periphery of the first fuel cell plate comprises receiving the plurality of plate supports in a plurality of outer peripheral cavities of the first fuel cell plate.

18. The method of claim 13 further comprising inserting an aligning member in the opening from a location exterior to the fuel cell plate in a lateral direction orthogonal to a longitudinal dimension of the first plate.

19. The method of claim 13 further comprising contacting a plate support of the plurality of plate supports with a casing of the fuel cell system in response to a shock or vibration applied to the fuel cell system.

20. The method of claim 13 wherein the connecting comprises further comprising connecting the plurality of plate supports to a membrane electrode assembly to connect the membrane electrode assembly to the first plate.

* * * * *